(12) United States Patent
Perez et al.

(10) Patent No.: US 12,331,382 B2
(45) Date of Patent: Jun. 17, 2025

(54) SINTERED ALLOY ARTICLES AND METHODS OF MAKING THE SAME

(71) Applicant: Kennametal Inc., Latrobe, PA (US)

(72) Inventors: Martin G. Perez, Latrobe, PA (US); Paul D. Prichard, Greensburg, PA (US); Matthew Yao, Belleville (CA); John Skwara, Latrobe, PA (US); Abdelhakim Belhadjhamida, Kingston (CA); Kevin M. Gamble, Latrobe, PA (US); Michael J. Meyer, Irwin, PA (US)

(73) Assignee: KENNAMETAL INC., Latrobe, PA (US)

( * ) Notice: Subject to any disclaimer, the term of this patent is extended or adjusted under 35 U.S.C. 154(b) by 1381 days.

(21) Appl. No.: 16/404,011

(22) Filed: May 6, 2019

(65) Prior Publication Data

US 2020/0353537 A1 Nov. 12, 2020

(51) Int. Cl.
| | |
|---|---|
| *C22C 19/07* | (2006.01) |
| *B22F 10/14* | (2021.01) |
| *B22F 10/34* | (2021.01) |
| *B29C 64/165* | (2017.01) |
| *B33Y 10/00* | (2015.01) |
| *B33Y 70/00* | (2020.01) |
| *B33Y 80/00* | (2015.01) |
| *B22F 10/28* | (2021.01) |
| *B29K 505/08* | (2006.01) |

(52) U.S. Cl.
CPC ............. *C22C 19/07* (2013.01); *B22F 10/14* (2021.01); *B22F 10/34* (2021.01); *B29C 64/165* (2017.08); *B33Y 10/00* (2014.12); *B33Y 70/00* (2014.12); *B22F 10/28* (2021.01); *B22F 2301/15* (2013.01); *B29K 2505/08* (2013.01); *B33Y 80/00* (2014.12)

(58) Field of Classification Search
None
See application file for complete search history.

(56) References Cited

U.S. PATENT DOCUMENTS

| | | | | |
|---|---|---|---|---|
| 3,966,422 A | * | 6/1976 | Kelley | ........... C22C 1/0433 75/238 |
| 2012/0243995 A1 | * | 9/2012 | Bunker | ........... F01D 5/18 416/95 |
| 2014/0271319 A1 | * | 9/2014 | Zheng | ........... B32B 15/015 419/9 |

FOREIGN PATENT DOCUMENTS

| | | |
|---|---|---|
| CN | 105143146 A | 12/2015 |
| CN | 105714171 A | 6/2016 |
| CN | 107083502 A | 8/2017 |
| CN | 107107187 A | 8/2017 |
| CN | 107649684 A | 2/2018 |

(Continued)

OTHER PUBLICATIONS

D. Karstrom et al., ASM Handbook.

(Continued)

*Primary Examiner* — Xiaobei Wang

(74) *Attorney, Agent, or Firm* — Christopher J. Owens

(57) ABSTRACT

Powder alloy compositions and associated additive manufacturing techniques are described herein for production of sintered articles with microstructure and/or enhanced wear and corrosion resistance. In some embodiments, an article comprises sintered cobalt-based alloy having chromium carbide precipitates dispersed therein, the chromium carbide precipitates having an average size less than 4 μm.

13 Claims, 4 Drawing Sheets

(56) References Cited

FOREIGN PATENT DOCUMENTS

| | | |
|---|---|---|
| CN | 108602118 A | 9/2018 |
| CN | 109311091 A | 2/2019 |
| DE | 102012006998 A1 | 12/2013 |
| DE | 102018116728 A1 | 2/2019 |

OTHER PUBLICATIONS

C.Guyard et al., Microstructural investigation of a Co-base alloy processed by liquid phase sinte.
C. Guyard et al., Journal of Material Sciences.
Sep. 26, 2023 Foreign Office Action German Application No. DE202010109044 (Pub No. DE102020109044A1), 12 Pages.
Jun. 16, 2023 Foreign Office Action Chinese Application No. CN202010294089.2, 22 Pages.

* cited by examiner

SINTERED ALLOY ARTICLES AND METHODS OF MAKING THE SAME

FIELD

The present invention relates to sintered alloy articles and, in particular, to sintered alloy articles fabricated via one or more additive manufacturing techniques.

BACKGROUND

Additive manufacturing generally encompasses processes in which digital 3-dimensional (3D) design data is employed to fabricate an article or component in layers by material deposition and processing. Various techniques have been developed falling under the umbrella of additive manufacturing. Additive manufacturing offers an efficient and cost-effective alternative to traditional article fabrication techniques based on molding processes. With additive manufacturing, the significant time and expense of mold and/or die construction and other tooling can be obviated. Further, additive manufacturing techniques make an efficient use of materials by permitting recycling in the process and precluding the requirement of mold lubricants and coolant. Most importantly, additive manufacturing enables significant freedom in article design. Articles having highly complex shapes can be produced without significant expense allowing the development and evaluation of a series of article designs prior to final design selection.

However, it is often difficult to manufacture alloy parts using additive manufacturing techniques, such as selective laser sintered (SLS) or selective laser melting (SLM). These processes are time consuming, and the resultant articles can exhibit substantial cracking due to internal stresses that form during the build.

SUMMARY

In view of these deficiencies, powder alloy compositions and associated additive manufacturing techniques are described herein for production of sintered articles with unique microstructure and/or enhanced wear and corrosion resistance. In some embodiments, an article comprises sintered cobalt-based alloy having chromium carbide precipitates dispersed therein, the chromium carbide precipitates having an average size less than 4 µm. In some embodiments, the chromium carbide precipitates have an average size less than 3 µm. Articles described herein can also exhibit complex shapes and contain one or more internal channels for passing fluid through the article.

In another aspect, methods of forming sintered articles are provided. Briefly, a method comprises providing powder cobalt-based alloy and forming the powder cobalt-based alloy into a green article via one or more additive manufacturing techniques. The green article is sintered to provide the sintered article comprising sintered powder cobalt-based alloy having chromium carbide precipitates dispersed therein, the chromium carbide precipitates having an average size less than 4 µm. In some embodiments, the green article can be a single piece. Alternatively, the green article can comprise at least two individual segments defining an interface between the two individual segments.

These and other embodiments are further described in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Sintered Articles

In one aspect, sintered alloy articles are described herein comprising desirable microstructural properties in addition to corrosion and/or wear resistance. In some embodiments, an article comprises sintered cobalt-based alloy having chromium carbide precipitates dispersed therein, the chromium carbide precipitates having an average size less than 4 µm. In some embodiments, the chromium carbide precipitates have an average size less than 3 µm. Standard deviation of the average size of the chromium carbide precipitates, in some embodiments, is less than 1 µm or less than 0.5 µm. Low values for standard deviation indicate low polydispersity and a generally single mode size distribution of the chromium carbide precipitates. Chromium carbide precipitates of the sintered cobalt-based alloy can also exhibit a D90 of less than 8 µm and/or a D50 of less than 4 µm.

Chromium carbide precipitates of the sintered cobalt-based alloy, in some embodiments, are of the formula $Cr_xC_y$. Chromium carbide precipitates can include, but are not limited to, $Cr_7C_3$, $Cr_{23}C_6$, and mixtures thereof. Moreover, chromium carbide precipitates can have a cubic or non-cubic crystalline structure. Chromium carbide precipitates can also exhibit a high occurrence rate in the cobalt matrix alloy, given the fine grain structure of the precipitates. For example, a 1,000 µm² region of a cross-sectional scanning electron micrograph (SEM) of the sintered powder cobalt-based alloy contains at least 200 chromium carbide precipitates. In some embodiments, at least 250 or at least 300 chromium carbide precipitates are present in the 1,000 µm² region of a cross-sectional SEM.

Figure 1:
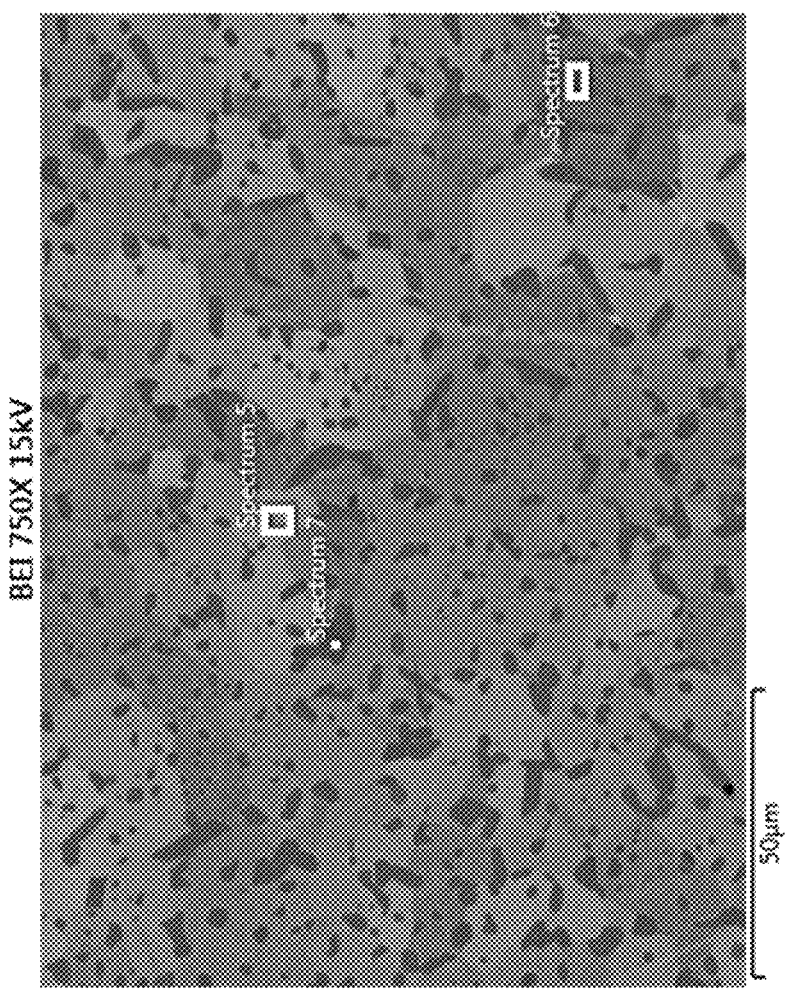
FIG. 1 is a cross-sectional SEM image taken from a sintered cobalt-based alloy article described herein, according to some embodiments.

FIG. 1 is a cross-sectional SEM image taken from a sintered cobalt-based alloy article described herein, according to some embodiments. As illustrated in the SEM, fine chromium carbide precipitates (dark) are dispersed throughout the cobalt matrix alloy (light). Energy dispersive spectra (EDS) were taken in several regions of the SEM to determine compositional parameters of the regions. The compositions parameters of each EDS spectrum are provided in Table I.

TABLE I

| | EDS Spectra Compositional Parameters | | |
|---|---|---|---|
| Element | Spectrum 5 (Co-matrix alloy) | Spectrum 6 (Co-matrix alloy) | Spectrum 7 (CrxCy precipitate) |
| C | 4.04 | 3.65 | 9.44 |
| Si | 1.23 | 1.21 | — |
| Cr | 21.39 | 21.66 | 69.93 |
| Fe | 1.95 | 1.97 | — |
| Co | 64.64 | 65.14 | 16.60 |
| Ni | 2.07 | 1.90 | — |
| W | 4.68 | 4.47 | 4.03 |
| Total | 100.00 | 100.00 | 100.00 |

Figure 2A:
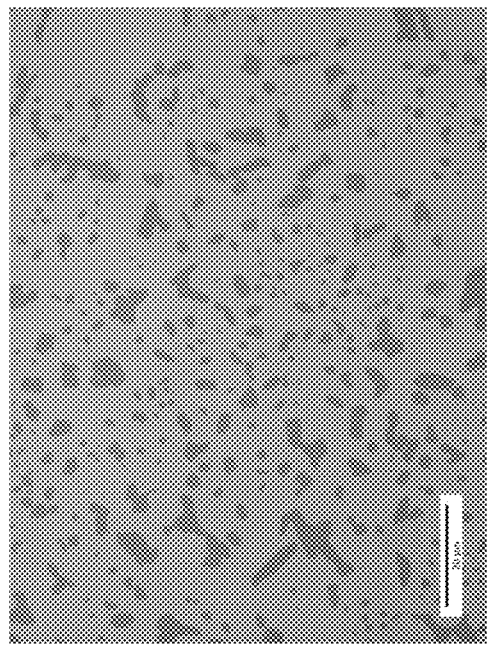
FIGS. 2A and 2B are cross-sectional optical images of a sintered cobalt-based alloy article having microstructural properties described herein.
Figure 2B:
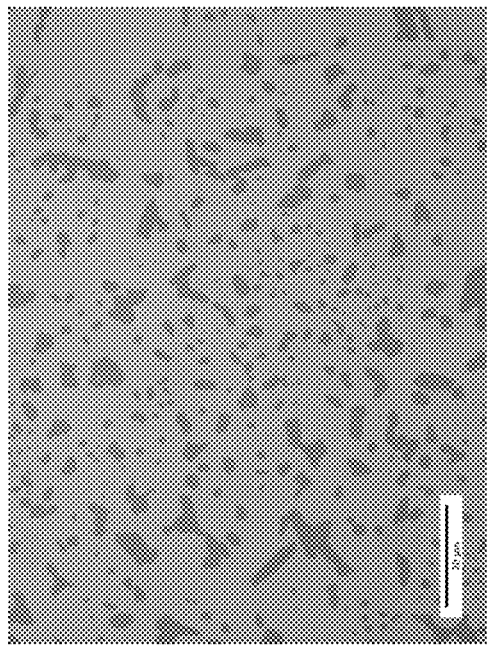

The size and distribution of the chromium carbide precipitates in sintered articles produced according to additive manufacturing methods described herein are in sharp contrast to cobalt-based alloy articles produced according to conventional powder metallurgical and casting techniques. FIGS. 2A and 2B are cross-sectional optical images of a sintered cobalt-based alloy article having microstructural properties described herein. As illustrated in the SEM images, fine chromium carbide precipitates (dark) are dispersed throughout the cobalt matrix alloy (light). The average size of the chromium carbide precipitates was 2.7 µm.

Figure 3B:
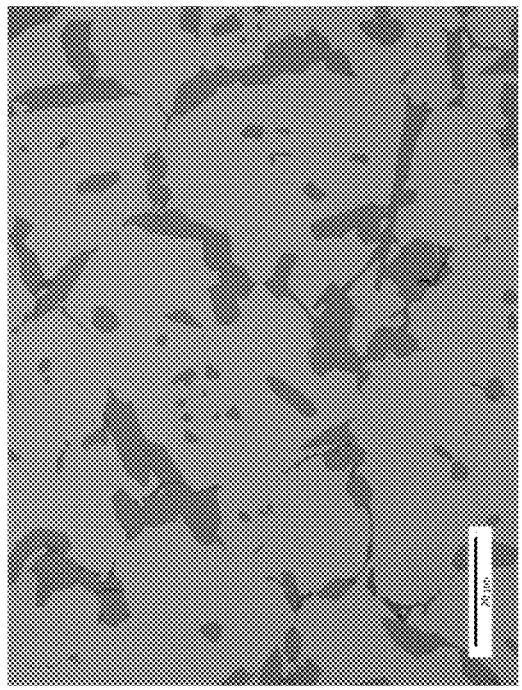
FIGS. 3A and 3B are cross-sectional optical images of a cobalt-based article formed via conventional press and sinter powder metallurgical techniques.
Figure 3A:
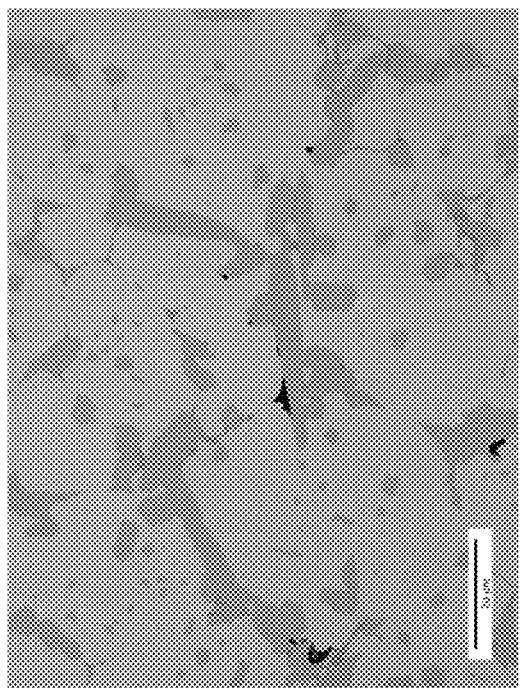
Figure 4B:
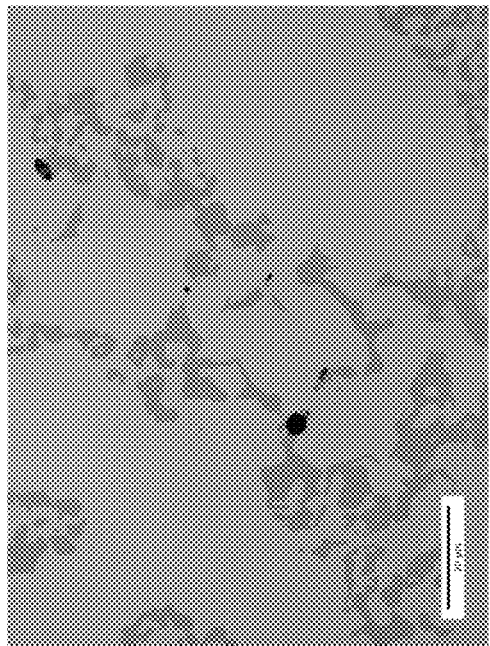
FIGS. 4A and 4B are cross-sectional optical images of a cobalt-based alloy article formed by casting.
Figure 4A:
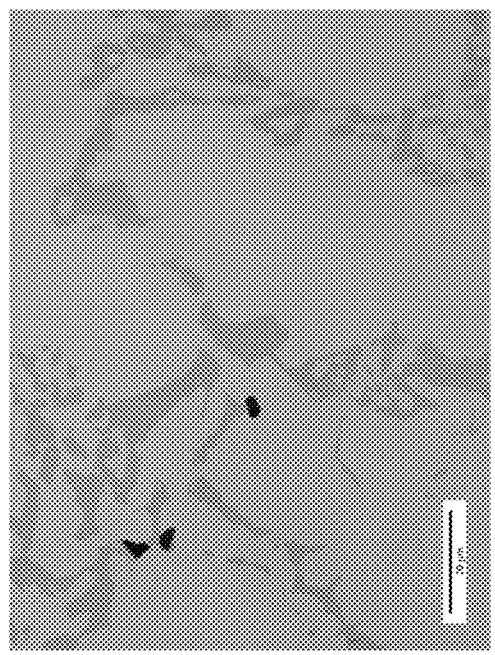

In contrast, FIGS. 3A and 3B are cross-sectional optical images of a cobalt-based alloy article formed via conventional press and sinter powder metallurgical (P/M) techniques. As shown in FIGS. 3A and 3B, the chromium carbide precipitates (dark) were much larger, with an average size of 4.6 µm. Moreover, the frequency at which the chromium carbide precipitates occurred in the cobalt matrix alloy was significantly less relative to FIGS. 2A and 2B. Additionally, FIGS. 4A and 4B are cross-sectional optical images of a cobalt-based alloy article formed by casting. Similar to the P/M article, the average size of the chromium carbide precipitates was significantly larger at 4.5 µm, and the occurrence of the precipitates was substantially reduced. The articles of FIGS. 2-4 were each fabricated with cobalt-based alloy of the same composition, rendering the method of production as the sole variable.

Chromium carbide precipitates of articles described herein can be located at grain boundaries of the sintered cobalt-based alloy as well as within the grains. Fine grain morphology and increased frequency of the chromium carbide precipitates can enhance strengthening of the sintered cobalt-based alloy relative to articles having larger precipitates. Chromium carbide precipitates at the grain boundaries, for example, can prevent or inhibit gross sliding and migration of the boundaries, and when present in sufficient quantities (as shown in FIGS. 1, 2A-B) form a skeletal network, which may support some applied stresses. Intragranular precipitation strengthens the cobalt matrix alloy by providing impediments to movements of dislocations, thereby inhibiting crystallographic slip.

Sintered cobalt-based alloy articles described herein, in some embodiments, are at least 98 percent theoretical density. Sintered cobalt-based alloy articles, for example, can be at least 99 percent theoretical density. In some embodiments, sintered cobalt-based alloys have less than 2 vol. % porosity or less than 1 vol. % porosity.

As described further below, sintered articles of the present application can be formed via one or more additive manufacturing techniques employing powder cobalt-based alloy. The powder cobalt-based alloy can have any compositional parameters consistent with achieving the microstructural characteristics described above. In some embodiments, the powder cobalt-based alloy has a composition selected from Table II.

TABLE II

| Composition of Co-based Powder Alloy | |
|---|---|
| Element | Amount (wt. %) |
| Chromium | 15-35 |
| Tungsten | 0-10 |
| Molybdenum | 0-3 |
| Nickel | 0-5 |
| Iron | 0-10 |
| Manganese | 0-3 |
| Silicon | 0-5 |
| Vanadium | 0-5 |
| Carbon | 0-4 |
| Boron | 0-5 |
| Cobalt | Balance |

The powder cobalt-based alloy, for example, can comprise 27-31 wt. % chromium, 2-5 wt. % tungsten, 1-3 wt. % nickel, 0.1-1 wt. % manganese, 0.5-3 wt. %-iron, 0.5-2 wt. % carbon, 0-2 wt. % silicon, 0-2 wt. % boron and the balance cobalt. In some embodiments, the cobalt-based powder alloy comprises one or more melting point reduction additives in an amount sufficient to permit sintering of the alloy powder in a temperature range of 1140° C. to 1210° C. Melting point reduction additive can be one or more elemental components of the powder alloy. In some embodiments, elemental melting point reduction additives include silicon and/or boron. The cobalt-based alloy, for example, may contain silicon and/or boron in individual amounts of 0.1-2 wt. %.

Sintered cobalt-based alloy articles described herein can exhibit complex shapes and/or architectures. In some embodiments, the sintered cobalt-based alloy articles are flow control components, pumps, bearings, valves, valve components, centrifuge components, disk stacks, heat exchangers and/or fluid handling components. Such components can find application in various industries including, but not limited to, the oil and gas industries. In some embodiments, the sintered cobalt-based alloy articles comprises one or more internal channels or conduits for passing fluid through the article. The internal channels or conduits can have any desired size and cross-sectional geometry. In some embodiments, internal channels exhibit a circular or elliptical cross-section. Alternatively, the internal channels may have a polygonal or curve-linear cross-sectional geometry. Moreover, the internal channels or conduits can take any path through the sintered cobalt-based alloy articles. Internal channel pathways can be linear, curved, spiral, serpentine or any combination thereof.

II. Methods of Forming Sintered Articles

In another aspect, methods of forming sintered articles are provided. A method comprises providing powder cobalt-based alloy and forming the powder cobalt-based alloy into a green article via one or more additive manufacturing techniques. The green article is sintered to provide the sintered article comprising sintered powder cobalt-based alloy having chromium carbide precipitates dispersed therein, the chromium carbide precipitates having an average size less than 4 µm. Sintered articles produced according to methods described herein can have any composition and microstructural properties described in Section I above. The sintered articles, for example, can comprise chromium carbide precipitates having composition, sizes, and occurrence frequencies described in Section I. As set forth above, FIGS.

1 and 2A-2B are cross-sectional SEM images of sintered cobalt-based alloy articles fabricated according to methods described herein employing binder jetting additive manufacturing techniques. The articles of FIGS. 1 and 2A-2B, for example, were formed by binder jetting powder cobalt-based alloy having composition selected from Table II and sintered at 1140° C. to 1210° C. for 0.25 to 3 hours. Binder jetting equipment from ExOne of Huntington, Pa. was employed to print the green article.

As described herein, the green article is produced from a powder cobalt-based alloy via one or more additive manufacturing techniques. The powder cobalt-based alloy can have a composition selected from Table II, in some embodiments. Moreover, the powder cobalt-based alloy can have an average particle size of 10 μm to 100 μm, in some embodiments. The cobalt-based alloy, for example can have an average particle size of 20 μm to 80 μm or 40 μm to 60 μm. Particle size of the cobalt-based alloy can be selected according to several considerations including, but not limited to, the additive manufacturing technique employed to fabricate the sintered article, powder packing characteristics, powder flow characteristics, and/or green article density. In some embodiments, green articles of methods described herein are greater than 50 percent theoretical density, where theoretical density is the density of the fully sintered cobalt-based alloy article. For example, a green article can be 51-55 percent theoretical density. Green articles having greater than 50 percent theoretical density can be produced via binder jetting, in some embodiments. Powder cobalt-based alloy, for example, can be selected to have a particle size distribution and morphology for producing green articles by binder jetting having densities greater than 50 percent theoretical density. Alternatively, powder cobalt-based alloy can be lightly sintered in a selective laser sintering process to produce green articles having densities greater than 50 percent theoretical density.

When binder jetting additive manufacturing techniques are employed to produce the green article, any organic binder consistent with the objectives of the present invention can be used. In some embodiments, organic binder comprises one or more polymeric materials, such as polyvinylpyrrolidone (PVP), polyethylene glycol (PEG) or mixtures thereof. Organic binder, in some embodiments, is curable which can enhance strength of the green article. Polymer binder used in printing can be aqueous binder or solvent binder. Additionally, the green articles can exhibit binder saturation of at least 80%, in some embodiments. Binder saturation, for example, can be set to 100% or greater than 100%, in some embodiments. Green articles comprising powder cobalt-based alloy can be produced with binder jetting equipment from ExOne of Huntingdon, Pa.

In some embodiments, carbon content of the powder cobalt-based alloy can be adjusted relative to the chemical identity of the binder in the binder jetting process. For example, carbon content of the powder cobalt-based alloy can be reduced in view of the chemical identity of the binder. In other embodiments, carbon content can be increased in view of the binder chemical identity.

Green articles can exhibit a single piece or monolithic architecture, in some embodiments. Green articles, in other embodiments, can comprise at least two individual segments defining an interface between the two individual segments. Any number of individual or independent segments is possible. Number of individual segments can be determined according to various considerations including size and/or geometry of the green article as well as the inclusion of any internal channels or conduits for passing fluids. In some embodiments, the green article is provided in multiple segments to permit removal of loose powder that accumulates during the additive manufacturing build process. The individual green segments are assembled into the complete green article and sintered to provide the sintered cobalt-based alloy article. In some embodiments, the green segments can be aligned by one or more alignment structures, such as pins, clamps and/or braces. The green segments may also comprise male/female mating parts for ensuring proper alignment when forming the complete green article for sintering. As the green segments can be produced independent of one another, the segments can have the same or differing composition and/or properties. In some embodiments, composition of the powder cobalt-based alloy can vary between individual segments. Moreover, green densities between the individual segments can vary, in some embodiments.

Green articles can be sintered at temperatures and for times to produce sintered articles having desired density. In some embodiments, green articles are sintered at temperatures of 1140° C. to 1210° C. and for times of 0.25 to 3 hours. Sintered cobalt-based alloy articles can be at least 98 percent theoretical density, in some embodiments. Sintered cobalt-based alloy articles can be at least 99 percent theoretical density, in some embodiments. Additionally, the sintered cobalt-based alloy articles can be free of cracks, including surface cracks. Sintering of the green articles can be conducted in vacuum or under an inert atmosphere. Compaction pressures, such as hot isostatic pressing, may be optional to produce sintered cobalt-based alloy articles having the high density values described hereinabove.

When the green article is formed of multiple green segments, the segments are arranged to contact one another and sintered. Interfaces between the segments can be eliminated by the sintering process, rendering an single piece sintered article. In some embodiments, one or more interfaces between green segments may be filled with bonding alloy. Bonding alloy may have the same or different composition than the powder cobalt-based alloy of the green segments. In some embodiments, bonding alloy is provided to the interface as loose powder alloy or as an alloy sheet. Alternatively, bonding alloy can be applied to one or more interface surfaces as a slurry. Suitable slurry compositions, in some embodiments, are disclosed in U.S. Pat. Nos. 7,262,240 and 6,649,682, which are incorporated herein by reference in their entireties.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. An article comprising:
   sintered powder cobalt-based alloy having chromium carbide precipitates dispersed therein, the chromium carbide precipitates having an average size less than 4 μm.

2. The article of claim 1, wherein the chromium carbide precipitates have an average size less than 3 μm.

3. The article of claim 1, wherein the chromium carbide precipitates comprise a mixture of cubic carbide precipitated and non-cubic carbide precipitates.

4. The article of claim 1, wherein the chromium carbide precipitates comprise $Cr_7C_3$, $Cr_{23}C_6$ or mixtures thereof.

5. The article of claim 1, wherein the average particle size of the chromium carbide precipitates has a standard deviation of less than 1 μm.

6. The article of claim 1, wherein the chromium carbide precipitates have a D90 of less than 8 μm.

7. The article of claim 1, wherein the chromium carbide precipitates have a D50 of less than 4 μm.

8. The article of claim 1, wherein a 1000 μm$^2$ region in a cross-sectional scanning electron micrograph contains, on average, at least 200 chromium carbide precipitates.

9. The article of claim 1, wherein the sintered powder cobalt-based alloy is at least 99 percent theoretical density.

10. The article of claim 1, wherein the sintered powder cobalt-based alloy is free of surface cracks.

11. The article of claim 1, wherein the cobalt based alloy comprises 27-31 wt. % chromium, 2-5 wt. % tungsten, 1-3 wt. % nickel, 0.1-1 wt. % manganese, 0.5-3 wt. %- iron, 0.5-2 wt. % carbon, 0-2 wt. % silicon, 0-2 wt. % boron and the balance cobalt.

12. The article of claim 1, wherein the cobalt alloy comprises silicon and/or boron in individual amounts of 0.1-2 wt. %.

13. The article of claim 11, wherein the cobalt alloy comprises silicon and boron in individual amounts of 0.1-2 wt. %.

* * * * *